2,764,354

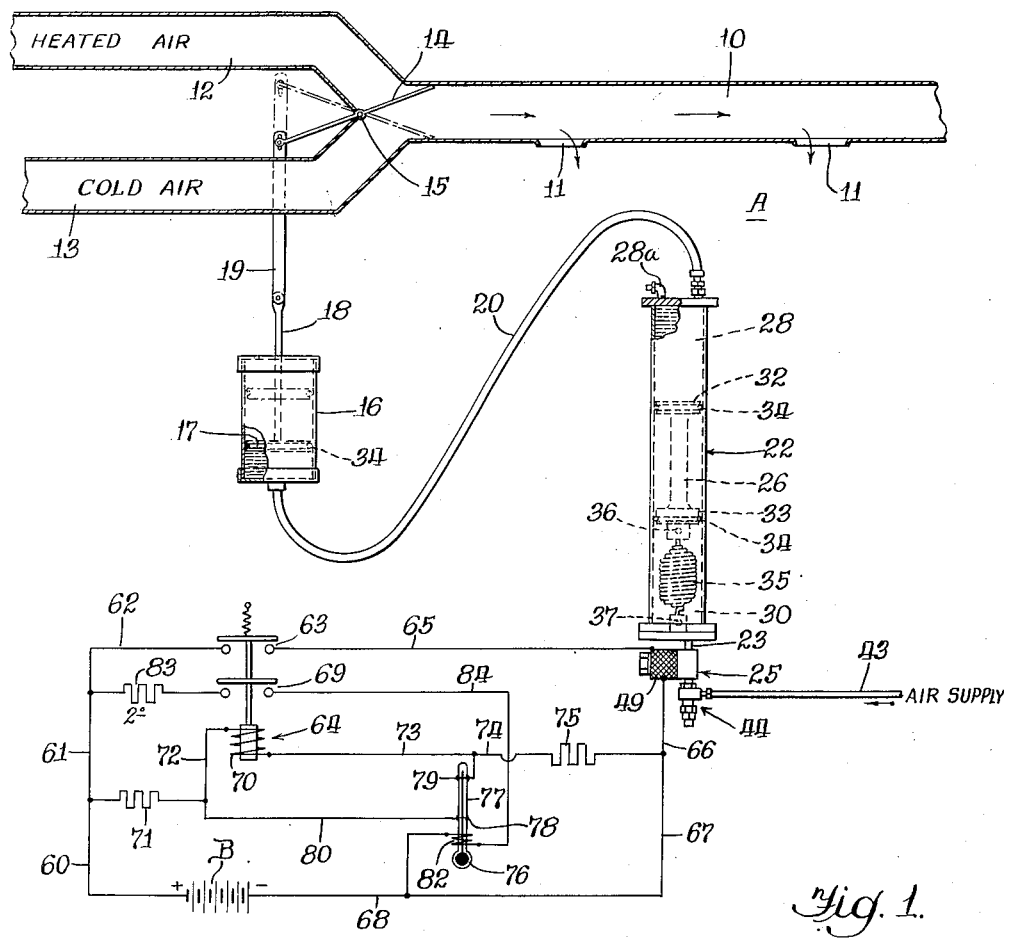
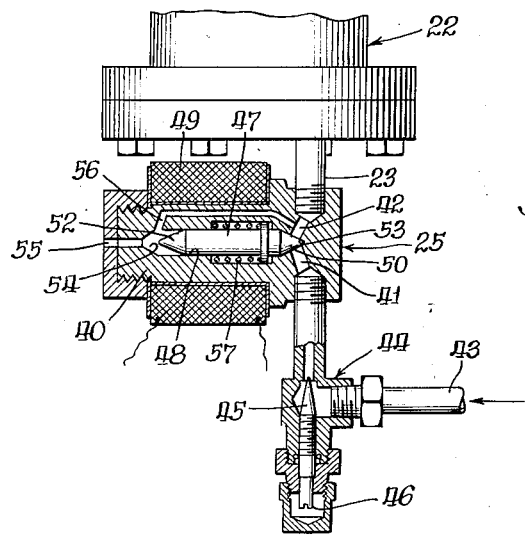
Fig. 1.
Fig. 2.
Inventors
William R. Peterson
Charles E. Krupp
Alex Stack
By Harvey M. Gillespie
Atty United States Patent Office 2,764,354
Patented Sept. 25, 1956

AUTOMATIC HYDRAULIC DAMPER

William R. Peterson, Oaklawn, Charles E. Krupp, Evanston, and Alex Stack, Berwyn, Ill., assignors to Vapor Heating Corporation, Chicago, Ill., a corporation of Delaware Application November 28, 1952, Serial No. 322,998

3 Claims. (Cl. 236—68)

The present invention relates to improvements in hydraulic damper controls, and more particularly to a damper control of this character which is responsive to temperature changes within an enclosed space so as to automatically maintain a predetermined temperature within the enclosed space.

It is among the principal objects of the invention to provide an extremely simple, yet highly effective and reliable, mechanism which is electrically controlled and pneumatically powered for automatically adjusting the position of a valve element by means of which the supply of a heating medium for heating the enclosure may be regulated.

In carrying out the above mentioned object, and purely for illustrative purposes, the movable valve element assumes the form of a damper which proportionately varies the delivery of heated and unheated air into the enclosure the temperature of which is being controlled, but it will be understood that, if desired, the movable valve element may be in a form suitable for controlling the delivery of heating medium to a heat exchange device.

A more specific object of the invention is to provide in a control system of the above character a positive drive for the damper or other valve element the movements of which are being regulated, and in which system the movements applied to the damper are derived directly by expansion of air delivered from a source thereof under pressure but in which such movements are stabilized so that the damper is not subject to sudden and uneven displacements, but will be moved slowly in step by step movements to an equalized position.

A similar and related object of the invention is to provide a heating and ventilating system of this character in which relatively large displacements of air issuing from the source under pressure are translated into extremely small yet positive and powerful movements of the damper so that the system can be operated within very fine degrees of tolerance. In this connection the invention contemplates a pneumatically operated system in which regulated expansion of the air from the pressure source is applied to the movable damper to vary its position through an hydraulic drive in the form of a static column of liquid which offers the mechanical advantage of an hydraulic ram and which also reduces frictional losses to a minimum.

Other objects and advantages of the invention will be readily apparent from the following description of the preferred embodiments shown in the accompanying drawing wherein:

Fig. 1 is a general view, somewhat schematic in its representation, showing the improved control system constructed in accordance with the principles of the present invention; and Fig. 2 is a fragmentary sectional view of a solenoid controlled valve employed in connection with the control system of the present invention.

Referring now to the drawings in detail and in particular to Fig. 1, the present control system has been illustrated in connection with a heating and ventilating system in which tempered air may be delivered into a compartment A or other enclosed space from an air distribution duct 10 having air outlets 11 leading therefrom. The duct 10 communicates at one end with branch conduits 12 and 13, the former serving to deliver heated air from a source (not shown) to the duct 10 and the latter serving to deliver unheated air thereto. The proportion of heated air and unheated air delivered to the duct 10 is regulated by a proportioning valve or damper 14 pivoted as at 15 and capable of movements through intermediate increments of motion from one extreme position wherein it closes the branch conduit 12 as shown in full lines, to another extreme position wherein it closes the branch conduit 13 as shown in dotted lines.

The damper 14 is adapted to be operated under the control of a fluid pressure motor in the form of a cylinder 16 having a piston 17 freely reciprocable therein and operatively connected to the damper through a piston rod 18 and connecting link 19 in such a manner that reciprocating movements of the piston are translated into oscillatory movements of the damper.

One end of the cylinder 16 is connected through a conduit 20 with an end of an elongated pneumatic expansion cylinder 22 and the other end of the cylinder 22 is in communication, through a short conduit 23 (see also Fig. 2), with the outlet port of a solenoid operated valve 25, the nature and function of which will be set forth presently.

Slidably disposed within the cylinder 22 is a spool-like plunger or piston 26 which divides the cylinder into two variable displacement chambers including an hydraulic chamber 28 and a pneumatic or air pressure chamber 30. The space existing within the chamber 28, within the conduit 20 and within the cylinder 16 on the side of the piston 16 remote from the piston rod 18 is filled with a non-compressible fluid such as a suitable oil and this fluid constitutes a non-compressible fluid column by means of which reciprocal movements of the plunger 26 are translated into reciprocal movements of the piston 17. An inlet fitting 28a may be provided in an end of the cylinder 22 to facilitate filling the hydraulic system.

The spool-like plunger 26 is provided with enlarged piston heads 32 and 33 at opposite ends thereof having O-rings 34 associated therewith to provide effective seals to isolate the hydraulic side of the cylinder from the pneumatic side thereof. The piston 17 of the cylinder 16 may be provided with a similar O-ring.

A tension coil spring 35 is disposed within the chamber 30 and is anchored at one end as at 36 to the piston 26 and at the other end as at 37 to an end wall of the cylinder 22. The chamber 30 constitutes a pneumatic expansion chamber and the spring 35 serves to normally maintain the piston 26 in the medial position in which it is shown in Fig. 1.

Referring now additionally to Fig. 2, the solenoid operated valve 25 involves in its general organization a non-magnetic body portion 40 having an inlet port 41 and an outlet port 42. The ports 41 and 42 are in the form of communicating bores provided in the body 40 and the port 42 is in communication with the pneumatic expansion chamber 30 of the cylinder 22 through the previously mentioned short conduit section 23. The inlet port 41 is in communication with a source of air under pressure, exemplified by the conduit 43, through a more or less conventional pressure reducing or needle valve assembly 44 including a valve element proper 45 which is capable of adjustment in the usual manner by inserting a screw driver or similar tool in the slotted end 46 thereof.

Communication between the inlet port 41 and the outlet port 42 of the valve body 40 is normally prevented by means of a reciprocable valve element 47 which is slidable in a bore 48 provided in the body 40 and which constitutes the movable core of a magnetic coil 49 surrounding the non-magnetic body 40. The valve element is formed with tapered ends 50 and 52, the former cooperating with a seat 53 to prevent communication between the ports 41 and 42 and the latter cooperating with a seat 54 to prevent egress of air through a bleeder port 55 which is normally in communication with the outlet port 42 through a bleeder passage 56. The valve element 47 is normally urged by means of a spring 57 to a position wherein the seat 54 is uncovered and wherein the tapered end 50 rests upon the seat 53 so as to block communication between the ports 41 and 42, or, in other words, prevent the admission of air from the source 43 to the pneumatic expansion chamber 30.

The coil of the magnetic valve 25 is disposed in an energizing circuit extending from the positive side of a battery B or other source of electrical energy, through leads 60, 61 and 62, normally open contacts 63 of a relay magnet 64, lead 65, coil 49 of the magnetic valve 25, and leads 66, 67 and 68 to the negative side of the battery. The relay magnet has associated therewith a second pair of normally open contacts 69 disposed in a circuit the function of which will appear presently.

The relay magnet 64 is provided with a winding or coil 70 disposed in a normally closed circuit leading from the positive side of the battery through lead 60, a current limiting resistor 71, lead 72, coil or winding 70, leads 73 and 74, a second current limiting resistor 75, and leads 67 and 68 to the negative side of the battery B.

A thermostat 76 disposed within the enclosure A is preferably of the mercury column type having a mercury column proper 77 adapted to engage the upper contact 79 disposed in a shunt circuit for the magnet coil 70 and extending from the battery B through lead 60, resistor 71, lead 80, contacts 78 and 79, lead 74, resistor 75 and leads 67 and 68 to the battery. The thermostat 76 is of the regulative type and may be set so that the column 77 thereof is adapted to engage the upper contact 79 when a predetermined temperature, for example 72° F. is attained within the enclosure A when the column 77 relies solely upon ambient temperature for its expansion.

The thermostat 76 is provided with an electrical heater in the form of a coil 82 disposed in an auxiliary heating circuit extending from the battery B through leads 60 and 61, current limiting resistor 83, contacts 69, lead 84, coil 82, and lead 68 to the battery. It will be seen therefore that the opening and closing movements of the contacts 69 will serve to recurrently apply heat to the thermostat 76. The resistor 83 constitutes a metering resistor in the auxiliary heating circuit just described and its ohmic value may be chosen so as to impart a heating value of approximately 2° F. to the coil, when energized, so that the contacts 78 and 79 will become bridged by the mercury column 77 at a temperature which is 2° lower than that for which the thermostat is set. Thus with an ambient temperature setting of 72° F. as previously stated, the contacts 78 and 79 will become bridged at a temperature of 70° F. with the auxiliary heater coil 62 energized. It will be seen therefore that when the temperature of the enclosure A is sufficiently high as to cause bridging of the contacts 78 and 79, with the additional 2° of heat applied to the column 77 by the auxiliary heater coil 82, a cycling action of the thermostat will ensue. This cycling action is due to the recurrent opening and closing of the contacts 69 as the shunt circuit for the coil 70 is periodically energized and deenergized under the influence of recurrent application and removal of auxiliary heat to the column 77 which establishes and breaks the shunt circuit by periodically bridging the contacts 78 and 79. This cyclic operation of the thermostat 76 serves to effect modulation of the movements of the damper 14 in opposite directions within very fine limits in response to small temperature changes within the compartment A, all in a manner that will become clear when the operation of the system as a whole is set forth.

When the temperature of the enclosed space A is relatively cool, for example below 70° F., the mercury column 77 will stand below the contact 79 and the previously described circuit for the coil 70 of the relay magnet 64 will remain energized and the contacts 63 and 69 in the circuit of the solenoid valve 25 and in the circuit of the auxiliary heater coil 82 respectively will be closed. In this manner the coil 49 (Fig. 2) of the solenoid operated valve 25 and the heater coil 82 will both be energized.

Energization of the coil 49 will shift the solenoid core or valve element 47 to the left as viewed in Fig. 2 and uncover the valve seat 53 so as to establish communication between the valve inlet and outlet ports 41 and 42, thus allowing air under pressure to flow through the needle valve 44 to the interior of the pneumatic expansion chamber 30 within the cylinder 22 to move the plunger 26 upwardly as viewed in Fig. 1 so as to force some of the fluid contained within the hydraulic chamber 28 out of the chamber and into the conduit 20. The displaced fluid in the conduit 20 enters the cylinder 16 of the hydraulic motor and thus moves the piston 17 in a direction to tilt the damper 14 about its pivotal axis 15 in a direction which will increase the amount of heated air delivered to the duct 10 from the branch conduit 12 and decrease the amount of cold air delivered to the duct from the conduit 13.

As the temperature of the enclosure A rises under the influence of delivery of heated air thereto, the mercury column 77 will rise steadily until such time as this column, augmented in height by the application of auxiliary heat thereto by virtue of energization of the previously described auxiliary heater circuit, engages the contact 79. At this time the shunt circuit will become effective to deenergize the relay coil 70 and thus initiate the cycling action of the thermostat 76 by opening the contacts 69 and breaking the shunt circuit.

Deenergization of the relay coil 70 will also serve to open the contacts 63 and consequently deenergize the coil 49 of the solenoid valve 25, thus allowing the spring 57 (Fig. 2) to move the valve element 47 against the seat 53 and prevent further flow of air under pressure through the valve. Movement of the valve element 47 against the seat 53 will uncover the seat 54 and the air which had previously been injected into the pneumatic expansion chamber 30 will be forced through the by-pass conduit 56 of the valve 25 to atmosphere under the influence of the spring 35, acting upon the plunger 26.

As the plunger 26 is thus drawn downwardly in the cylinder 22 as viewed in Fig. 1, the hydrostatic head of fluid in the hydraulic column including the chamber 28, will be shifted in such a manner as to draw the piston 17 of the hydraulic motor 16 downwardly as viewed in Fig. 1 to swing the damper 14 about its pivotal axis 15 and decrease the rate of flow of heated air into the duct 10 and increase the rate of flow of cold air thereinto. Such reversal of the proportioning of heated and cold air will be reflected in the temperature of the compartment or enclosure A and the tendency will be for the mercury column 77 to again fall, thus initiating the cycling action of the thermostat previously referred to.

With the temperature of the enclosure A standing at or relatively near the functional setting of the thermostat 76, the cycling action of the latter will be relatively fast in response to small variations in temperature conditions. The needle valve 44 is provided for the purpose of avoiding sudden displacements of the hydraulic fluid column in the hydraulic chamber 28, conduit 20 and cylinder 16. In this manner wide arcuate fluttering movements of the damper 14 are avoided.

It will be observed that when the temperature of the enclosure is relatively cool, more auxiliary heat will be required to bring the height of the column 77 into contact-closing position and the auxiliary heater will dissipate its heat quite rapidly. As a consequence the contacts 78 and 79 will remain unbridged for longer cycling periods when the enclosure is cool. However, as the temperature of the enclosure is brought closer to the functional setting of the thermostat, the contacts 78 and 79 will remain unbridged for shorter periods of time while they will remain bridged for correspondingly longer periods until such time as an equilibrium has been reached wherein the opening and closing periods of time for the contacts are equal. When such a degree of equilibrium has been attained, the cycling action of the thermostat is relatively fast and there will be no appreciable flow of air under pressure through the solenoid valve 25 or at least the small amounts of air intermittently admitted to and ejected from the pneumatic expansion chamber 30 will be insufficient to effectively displace the plunger 26 or the hydrostatic head of fluid controlled thereby. As a consequence the damper 14 will remain substantially at a standstill.

While the invention has been illustrated herein in connection with a specific form of ventilating and heating system involving the blending of heated and unheated air, it will be apparent that it may readily be employed in connection with temperature control systems of other constructions. The invention therefore is not to be limited to the specific construction herein shown except insofar as said constructions are specified in the appended claims.

We claim:

1. In a temperature control system, a member constantly movable to effect momentary forward and reverse movements to regulate the flow of a heating medium to an enclosure, an hydraulic motor including a cylinder and a piston reciprocable therein and providing a variable volume hydraulic fluid displacement chamber on one side thereof, means operatively connecting the piston and movable member in driving relationship, a pressure cylinder having a plunger reciprocable therein and dividing the cylinder into a variable volume hydraulic pressure chamber and a pneumatic expansion chamber, a conduit establishing fluid communication between said variable volume hydraulic chambers, a non-compressible fluid completely filling said conduit and the variable volume hydraulic chambers in communication therewith and establishing an hydrostatic head of fluid between said plunger and piston, a source of air under pressure, activating means alternatively effective to either connect said source of air under pressure with said pneumatic expansion chamber or to discharge air therefrom and thereby impart to said movable means said series of momentary forward and reverse movements, the said activating means comprising a valve structure provided with an air delivery port for delivering compressed air into the pneumatic chamber, a bleeder port for discharging air therefrom, a two-position valve element normally positioned to close said delivery port and to open said bleeder port, a solenoid operable upon energization thereof for moving said valve element to a position to open said delivery port and close said bleeder port, and means responsive to temperature variations in said enclosure for controlling the energization of said solenoid.

2. A temperature control system as defined in claim 1 in which a pressure reducing valve is disposed between said source and said pneumatic expansion chamber for regulating the flow of air to said expansion chamber when said valve is opened.

3. In a temperature control system, a movable member adapted by its movements to regulate the flow of a heating medium to an enclosure, an hydraulic motor including a cylinder and a piston reciprocable therein and providing a variable volume hydraulic fluid displacement chamber on one side thereof, means operatively connecting the piston and movable member in driving relationship, a pressure cylinder having a plunger reciprocable therein and dividing the cylinder into a variable volume hydraulic pressure chamber and a pneumatic expansion chamber, a conduit establishing fluid communication between said variable volume hydraulic chambers, a non-compressible fluid completely filling said conduit and the variable volume hydraulic chambers in communication therewith and establishing an hydrostatic head of fluid between said plunger and piston, a source of air under pressure, activating means alternatively effective to either connect said source of air under pressure with said pneumatic expansion chamber or to discharge air therefrom, whereby said movable means is adjusted by a series of momentary forward and reverse movements, the said activating means comprising a valve structure provided with an air delivery port for delivering compressed air into the pneumatic chamber, a bleeder port for discharging air therefrom, a two-position valve element normally positioned to close said delivery port and to open said bleeder port, a solenoid operable upon energization thereof for moving said valve element to a position to open said delivery port and close said bleeder port, means responsive to temperature variations in said enclosure for controlling the energization of said solenoid, a thermostat, a relay controlled thereby provided with a pair of normally open contacts connected in circuit with the solenoid for operating said valve element in one direction, an electrical heater for applying auxiliary heat to the thermostat, a second pair of normally open relay contacts, and an energizing circuit for the electrical heater connected through said second pair of contacts whereby said opening and closing of said heater circuit produces cycling operations of said relay and said two-position valve.

References Cited in the file of this patent

UNITED STATES PATENTS

| | | |
|---|---|---|
| 382,165 | Johnson | May 1, 1888 |
| 1,163,541 | Hultin | Dec. 7, 1915 |
| 1,886,366 | Bailey | Nov. 8, 1932 |
| 2,014,906 | Munoz | Sept. 17, 1935 |
| 2,118,292 | Booth | May 24, 1938 |
| 2,317,640 | Ray | Apr. 27, 1943 |
| 2,401,004 | Lehane et al. | May 28, 1946 |